Patented Aug. 27, 1935

2,012,462

UNITED STATES PATENT OFFICE 2,012,462

STABILIZATION OF PEROXIDE SOLUTIONS

Carl Alexander Agthe, Zurich, and Rudolf Blaser, Basel, Switzerland, assignors to the firm of J. R. Geigy A. G., Basel, Switzerland No Drawing. Application June 8, 1933, Serial No. 674,946. In Germany June 22, 1932

7 Claims. (Cl. 23—251)

Bleaching baths which contain a peroxide as the bleaching agent generally decompose far too quickly, so that the active oxygen is lost without being utilized. Attempts to stabilize such baths have therefore not been lacking and it has been found that a certain degree of stabilization can be attained by means of some chemical substances.

Thus for example sodium silicate (water-glass) and sodium pyrophosphate have largely been used for this purpose. On the other hand organic compounds, such as are described in German specifications No. 321,616 (salicylic acid), No. 318,220 (aniline), No. 318,134 and No. 242,324 have scarcely found application in the bleaching industry; for their use always involves the danger that, in so far as they are used alone and in relatively large proportions, they may become oxidized to compounds which have dyeing properties and whose presence in a bleaching bath is undesired. They have also the disadvantage that their stabilizing action is good only in a neutral bath; as the alkalinity of the bath increases they lose their stabilizing action, indeed much more quickly than do the best of the known stabilizers, namely sodium silicate and sodium pyrophosphate.

According to the present invention agents having a very good stabilizing action on peroxide solutions are obtained by mixing in suitable proportion a salt of pyrophosphoric acid and a sulphonic acid or carboxylic acid of an amine of the aromatic series or a salt thereof. Such agents are added to the bleaching bath in determined quantities according to the degree of stabilization desired.

The action attained with such a mixture is not additive, but surprisingly is much better than the sum of the actions of the ingredients; moreover they stabilize well baths which are strongly alkaline and have the further important advantage that they possess a good anti-catalytic action against the destructive influence of metals on the bleaching liquors.

Of particular importance is the behaviour of the alkaline earth salts of the amino-sulphonic and amino-carboxylic acids which come into question for the production of the stabilizing agents, particularly the barium salts. In admixture with pyrophosphates they have a stabilizing action which in weakly alkaline solutions is about as good as, and in strongly alkaline solutions is appreciably superior to, that of the corresponding sodium salts.

The following examples illustrate the effect attained with preparations in accordance with the invention:—

Example 1

2 grams of sodium perborate are dissolved in 150 ccm. of distilled water and the solution is brought to the pH-value 9.4 by addition of hydrochloric acid. 1 gram of the stabilizer is dissolved in the solution, the solution is heated to 95° C. and the decrease in the content of active oxygen in the course of time is determined. The results are shown in the following table in which are compared the actions of a mixture in accordance with the invention and the ingredients of the mixture used separately:—

| Stabilizer | Active O$_2$ | | | |
| --- | --- | --- | --- | --- |
| | Initially | After | | |
| | | ½ hour | 1 hour | 2 hours |
| | Per cent | Per cent | Per cent | Per cent |
| Sodium pyrophosphate | 100 | 76.5 | 59.5 | 36 |
| Sodium sulphanilate | 100 | 26 | 7.6 | |
| Sodium pyrophosphate and sodium sulphanilate mixed in the proportion 4:1 | 100 | 87 | 74 | 58 |

Example 2

The solution consists of 150 ccm. of distilled water, 1.2 ccm. of hydrogen peroxide of 30 per cent strength, 1.6 ccm. of normal caustic soda solution and 0.5 gram of stabilizer.

| Stabilizer | Active O$_2$ | | | |
| --- | --- | --- | --- | --- |
| | Initially | After | | |
| | | ½ hour | 1½ hours | 3½ hours |
| | Per cent | Per cent | Per cent | Per cent |
| Neutralized sodium pyrophosphate | 100 | 85 | 59 | 27 |
| Sodium 1:4-acetylaminobenzenesulphonate | 100 | 13 | | |
| Mixture of the two in the proportion 4:1 | 100 | 88 | 72 | 58 |

Example 3

The solution consists of 150 ccm. of conductivity water, 1.2 ccm. of normal caustic soda solution, 1.2 ccm. of hydrogen peroxide of 30 per cent strength and 0.5 gram of stabilizer.

| Stabilizer | Active O₂ | | |
|---|---|---|---|
| | Initially | After | |
| | | 1½ hours | 5 hours |
| | Per cent | Per cent | Per cent |
| Neutralized sodium pyrophosphate_ | 100 | 72 | 39.5 |
| Mixed with sodium benzylaminosulphonate | 100 | 83 | 68 |
| Mixed with sodium metanilate | 100 | 81 | 67 |
| Mixed with potassium diethylmetanilate | 100 | 81 | 65 |
| Mixed with sodium ethyl-benzyl-aniline-sulphonate | 100 | 84 | 69 |

(In each case 9 parts by weight of the pyrophosphate are mixed with 1 part by weight of the sulphonate.)

Example 4

The solution consists of 150 ccm. of distilled water, 1.6 ccm. of normal caustic soda solution, 1.6 ccm. of hydrogen peroxide of 30 per cent strength and 1 gram of stabilizer.

| Stabilizer | Active O₂ | | |
|---|---|---|---|
| | Initially | After | |
| | | 3 hours | 7 hours |
| | Per cent | Per cent | Per cent |
| Neutralized sodium pyrophosphate_ | 100 | 83.9 | 66.0 |
| Mixed with sodium meta-amino-benzoate | 100 | 89.2 | 77.3 |
| Mixed with sodium ortho-amino-benzoate | 100 | 86.3 | 73.5 |
| Mixed with sodium 2:5-amino-naphthalene-sulphonate | 100 | 86.3 | 73.6 |

(The sodium pyrophosphate and the amino-carboxylic acid or amino-sulphonic acid salt are in each case mixed in the proportion of 10:1.)

Example 5

The solution consists of 150 ccm. of distilled water, 1.4 ccm. of normal caustic soda solution, 1.2 ccm. of hydrogen peroxide of 30 per cent strength, 0.5 gram of stabilizer and 0.0015 gram of copper sulphate.

| Stabilizer | Active O₂ | | |
|---|---|---|---|
| | Initially | After | |
| | | ½ hour | 1½ hours |
| | Per cent | Per cent | Per cent |
| Neutralized sodium pyrophosphate_ | 100 | 49 | 29 |
| Mixed with sodium sulphanilate in the proportion 10:1 | 100 | 92 | 66 |

Example 6

The solution consists of 150 ccm. of distilled water, 5 ccm. of normal caustic soda solution, 1.2 ccm. of hydrogen peroxide of 30 per cent strength and 1 gram of stabilizer.

| Stabilizer | Active O₂ | | |
|---|---|---|---|
| | Initially | After | |
| | | ¼ hour | ½ hour |
| | Per cent | Per cent | Per cent |
| Neutralized sodium pyrophosphate mixed with sodium sulphanilate__ | 100 | 58 | 16 |
| Neutralized sodium pyrophosphate mixed with barium sulphanilate in the proportion 10:1 | 100 | 72 | 34 |

What we claim is:

1. A process of stabilizing peroxide solutions, consisting in mixing the solution at temperatures close to 95° C. with a salt of pyrophosphoric acid and a substituted amine of the aromatic series of the general formula

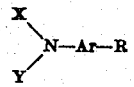

wherein X and Y represent hydrogen, an alkyl or aralkyl radical, Ar represents a radical of the benzene or naphthalene series, and R represents a solubilizing radical having hydrogen, an alkaline or alkaline-earth metal as cation.

2. A process of stabilizing peroxide solutions, consisting in mixing the solution at temperatures close to 95° C. with a salt of pyrophosphoric acid and a substituted amine of the aromatic series of the general formula

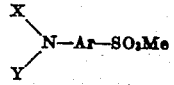

wherein X and Y represent hydrogen, an alkyl or aralkyl radical, and Ar represents a radical of the benzene or naphthalene series, Me being a cation such as hydrogen, an alkaline or alkaline-earth metal radical.

3. A process of stabilizing peroxide solutions, consisting in mixing the solution at temperatures close to 95° C. with a salt of pyrophosphoric acid and a substituted amine of the aromatic series of the general formula

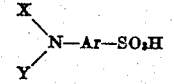

wherein X and Y represent hydrogen, an alkyl or aralkyl radical, and Ar represents a radical of the benzene or naphthalene series.

4. A process of stabilizing peroxide solutions, consisting in mixing the solution at temperatures close to 95° C. with a salt of pyrophosphoric acid and a substituted amine of the aromatic series of the general formula

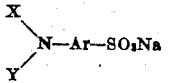

wherein X and Y represent hydrogen, an alkyl or aralkyl radical, and Ar represents a radical of the benzene or naphthalene series.

5. A process of stabilizing peroxide solutions, consisting in mixing the solution at temperatures close to 95° C. with a salt of pyrophosphoric acid and a substituted amine of the aromatic series of the general formula

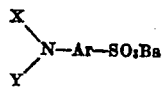

wherein X and Y represent hydrogen, an alkyl or aralkyl radical, and Ar represents a radical of the benzene or naphthalene series.

6. A preparation for stabilizing peroxide solutions, consisting of a mixture of a salt of pyrophosphoric acid with a substituted amine of the aromatic series of the general formula

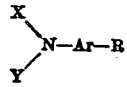

wherein X and Y represent hydrogen, an alkyl or aralkyl radical, Ar represents a radical of the benzene or naphthalene series, and R represents a solubilizing radical having hydrogen, an alkaline or alkaline-earth metal as cation.

7. A preparation for stabilizing peroxide solutions, consisting of a mixture of a salt of pyrophosphoric acid with a substituted amine of the aromatic series of the general formula

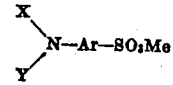

wherein X and Y represent hydrogen, an alkyl or aralkyl radical, and Ar represents a radical of the benzene or naphthalene series, Me being a cation such as hydrogen, an alkaline or alkaline-earth metal.

CARL ALEXANDER AGTHE.
RUDOLF BLASER.